(12) United States Patent
Ichihashi et al.

(10) Patent No.: US 6,519,017 B1
(45) Date of Patent: Feb. 11, 2003

(54) LIQUID CRYSTAL DISPLAY COMPRISING LIQUID CRYSTAL CELL, LINEARLY POLARIZING MEMBRANE, CHOLESTERIC LIQUID CRYSTAL LAYER AND QUARTER WAVE PLATE

(75) Inventors: Mitsuyoshi Ichihashi, Shizuoka (JP); Ken Kawata, Kanagawa (JP); Kohei Arakawa, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 255 days.

(21) Appl. No.: 09/705,825

(22) Filed: Nov. 6, 2000

(30) Foreign Application Priority Data

Dec. 27, 1999 (JP) .......................... 11-369114

(51) Int. Cl.$^7$ ........................................ G02F 1/1335
(52) U.S. Cl. ........................................ 349/117; 349/118
(58) Field of Search ................................. 349/117, 118

(56) References Cited

U.S. PATENT DOCUMENTS

| | | | |
|---|---|---|---|
| 5,805,253 A | * | 9/1998 | Mori et al. .................. 349/118 |
| 6,171,518 B1 | * | 1/2001 | Hikmet et al. .......... 252/299.01 |
| 6,294,229 B1 | * | 9/2001 | Satoh et al. ............ 252/299.01 |

FOREIGN PATENT DOCUMENTS

| | | |
|---|---|---|
| JP | 10-177167 | 6/1980 |
| JP | 5-27118 | 2/1993 |
| JP | 5-27119 | 2/1993 |
| JP | 8-234196 | 9/1996 |
| JP | 8-297280 | 11/1996 |
| JP | 10-68816 | 3/1998 |
| JP | 10-90521 | 4/1998 |
| JP | 10-260387 | 9/1998 |

* cited by examiner

Primary Examiner—James Dudek
(74) Attorney, Agent, or Firm—Burns, Doane, Swecker & Mathis, LLP

(57) ABSTRACT

A liquid crystal display comprises a liquid crystal cell, a linearly polarizing membrane, a cholesteric liquid crystal layer and a quarter wave plate. The cholesteric liquid crystal layer is divided into two or more areas having different spiral pitches of cholesteric liquid crystal. The quarter wave plate comprises an optically anisotropic layer A and an optically anisotropic layer B. One of the optically anisotropic layers A and B is formed from liquid crystal molecules. The other is formed from liquid crystal molecules or made of a polymer film. The quarter wave plate gives a retardation value per wavelength within the range of 0.2 to 0.3 at each wavelength of 480 nm, 550 nm and 630 nm.

8 Claims, 5 Drawing Sheets

LIQUID CRYSTAL DISPLAY COMPRISING LIQUID CRYSTAL CELL, LINEARLY POLARIZING MEMBRANE, CHOLESTERIC LIQUID CRYSTAL LAYER AND QUARTER WAVE PLATE

FIELD OF THE INVENTION

The present invention relates to a liquid crystal display comprising a liquid crystal cell, a linearly polarizing membrane, a cholesteric liquid crystal layer and a quarter wave plate. The cholesteric liquid crystal layer is divided into two or more areas having different spiral pitches of cholesteric liquid crystal.

BACKGROUND OF THE INVENTION

Liquid crystal displays include various display modes, such as TN (twisted nematic), IPS (in plane switching), FLC (ferroelectric liquid crystal), OCB (optically compensatory bend), STN (super twisted nematic), VA (vertically aligned), HAN (hybrid aligned nematic) and GH (guest host). A liquid crystal display of any mode essentially comprises a liquid crystal cell and a linearly polarizing membrane. Rod-like liquid crystal molecules (which are aligned depending on whether voltage is applied or not) in the liquid crystal cell optically affect on polarized light having passed through the linearly polarizing membrane to display an image.

A method using a color filter is practically adopted in a liquid crystal display to display a color image, though various methods have been proposed. The color filter for liquid crystal display is divided into two or more areas, which absorb light in different wavelength regions (usually, red (R), green (G) and blue (B) regions). Light is optically separated through the color filter into R, G and B components, and then the components are mixed to display the color image.

Dyes or pigments have been conventionally used to produce the color filter.

Japanese Patent Provisional Publication Nos. 8(1996)-234196, 8(1996)-297280, 10(1998)-177167 and 10(1998)-260387 propose a color filter comprising a cholesteric liquid crystal layer formed from cholesteric liquid crystal in place of the conventional filter of the dyes or pigments. Since the cholesteric liquid crystal layer gives a selective reflection spectrum having nearly ideal square shape, the layer does not lower the purity of displayed color. The spiral pitch of cholesteric liquid crystal in the layer can be adjusted according to the wavelength of R, G or B.

The cholesteric liquid crystal layer reflects a light component circularly polarized in the same direction as the spiral of the liquid crystal. In the case that the cholesteric liquid crystal layer is used as a color filter, a quarter wave plate, which converts linearly polarized light into circularly polarized light (or which converts circularly polarized light into linearly polarized light) should be used in combination with the cholesteric liquid crystal layer.

SUMMARY OF THE INVENTION

In a liquid crystal display comprising the cholesteric liquid crystal layer and the quarter wave plate, a performance of the display depends on functions of not only the cholesteric liquid crystal layer but also the quarter wave plate. Most of the conventional quarter wave plates give phase retardation of λ/4 (quarter wave) at particular wavelengths. Accordingly, the quarter wave plate must be divided into plural areas corresponding to areas of the cholesteric liquid crystal layer, which absorb light in different wavelength regions (usually R, G and B).

Each of Japanese Patent Provisional Publication Nos. 5(1993)-27118, 5(1993)-27119, 10(1998)-68816 and 10(1998)-90521 discloses a phase retarder comprising two polymer films, which are so laminated that the phase retardation of λ/4 is given within a wide wavelength region. However, the quarter wave plate comprising two polymer films is relatively thick. The thick plate offsets the most important advantage of the liquid crystal display (namely a very thin display device compared with the other displays).

An object of the invention is to provide a thin liquid crystal display comprising a cholesteric liquid crystal layer and a quarter wave plate, which is not divided into two or more areas.

The present invention provides a liquid crystal display which comprises a liquid crystal cell, a linearly polarizing membrane, a cholesteric liquid crystal layer and a quarter wave plate, said cholesteric liquid crystal layer being divided into two or more areas having different spiral pitches of cholesteric liquid crystal, wherein the quarter wave plate comprises an optically anisotropic layer A and an optically anisotropic layer B, one of said optically anisotropic layers A and B being formed from liquid crystal molecules, the other being formed from liquid crystal molecules or made of a polymer film, and said quarter wave plate giving a retardation value per wavelength within the range of 0.2 to 0.3 at each wavelength of 480 nm, 550 nm and 630 nm.

The applicants have studied a quarter wave plate, and have succeeded in preparing a quarter wave plate of wide wavelength region, which suitably works with a cholesteric liquid crystal layer. The quarter wave plate comprises two optically anisotropic layers A and B. At least one of them is formed from liquid crystal molecules. The quarter wave plate comprising the two optically anisotropic layers A and B can give λ/4 within a wide wavelength region. When the quarter wave plate of the wide wavelength region is used with a cholesteric liquid crystal layer in a liquid crystal display, the quarter wave plate can convert linearly polarized light into circularly polarized light (or convert circularly polarized light into linearly polarized light) in a wide wavelength region without dividing the layer into two or more areas.

At least one of the two optically anisotropic layers A and B is formed from liquid crystal molecules. Accordingly, the quarter wave plate can be thinner than a conventional plate comprising laminated two polymer films. Therefore, the quarter wave plate of the present invention is thin and light enough to be suitably used in a liquid crystal display.

Further, optical characteristics of the optically anisotropic layer can easily be controlled where the layer is formed from liquid crystal molecules. For example, the optical direction of the optically anisotropic layer can easily be set by selecting a rubbing direction of the liquid crystal molecules. Accordingly, it is unnecessary to cut films into chips in a conventional manner.

As is described above, it is not necessary to divide the quarter wave plate according to the invention into two or more areas. Therefore, the present invention can provide a thin liquid crystal display.

DETAILED DESCRIPTION OF THE INVENTION

[Optical Characteristics of Quarter Wave Plate]

Figure 1:
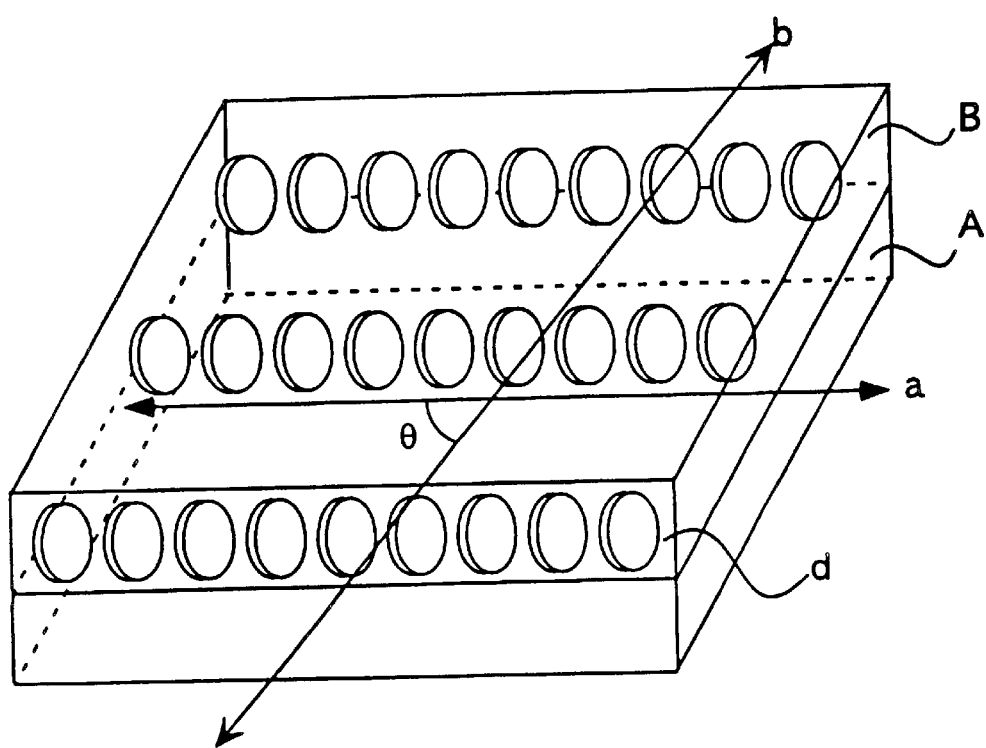
FIG. 1 schematically illustrates an embodiment of a quarter wave plate.

The quarter wave plate used in the liquid crystal display gives λ/4 within a wide wavelength region. The quarter wave plate of the wide wavelength region means that a retardation value (Re) per wavelength (λ) is within the range of 0.2 to 0.3 at each wavelength of 480 nm, 550 nm and 630 nm. The Re/λ is preferably in the range of 0.21 to 0.29, more preferably in the range of 0.22 to 0.28, further preferably in the range of 0.23 to 0.27, and most preferably in the range of 0.24 to 0.26.

The Re means a retardation value (in plane) of incident light along the normal line of the optically anisotropic layer. The value of Re is defined by the following formula.

$$Re = (nx - ny) \times d$$

In the formula, nx and ny are the main refractive indexes in plane of the optically anisotropic layer, and d is the thickness (nm) of the optically anisotropic layer.

The quarter wave plate of the wide wavelength region comprises two optically anisotropic layers A and B. The quarter wave plates can be classified into two embodiments.

In the first embodiment, the angle between the slow axes in planes of the optically anisotropic layers A and B is set within the range of 75° to 105°, preferably 80° to 100°, more preferably 85° to 95°, and most preferably 87° to 93°. In the present specification, the term "slow axis" means the direction giving the maximum refractive index. The term "angle between the slow axes" means an angle obtained by projecting the angle between the two slow axes onto the same plane.

The two optically anisotropic layers A and B in the first embodiment preferably have retardation values satisfying the formulas (1) and (2).

$$Re550A < Re550B \quad (1)$$

$$Re480B/Re550B < Re480A/Re550A \quad (2)$$

In the formulas, Re480A and Re550A are retardation values of the optically anisotropic layer A at 480 nm and 550 nm, respectively. Re480B and Re550B are retardation values of the optically anisotropic layer B at 480 nm and 550 nm, respectively.

The values of Re550A and Re550B satisfy preferably the formula (1a), more preferably the formula (1b), further preferably the formula (1c), furthermore preferably the formula (1d) and most preferably the formula (1e).

$$100 \text{ nm} < Re550B - Re550A < 180 \text{ nm} \quad (1a)$$

$$120 \text{ nm} < Re550B - Re550A < 160 \text{ nm} \quad (1b)$$

$$125 \text{ nm} < Re550B - Re550A < 150 \text{ nm} \quad (1c)$$

$$130 \text{ nm} < Re550B - Re550A < 145 \text{ nm} \quad (1d)$$

$$135 \text{ nm} < Re550B - Re550A < 140 \text{ nm} \quad (1e)$$

The values of Re480A, Re550A, Re480B and Re550B satisfy preferably the formula (2a) and more preferably the formula (2b).

$$Re480A/Re550A - Re480B/Re550B > 0.08 \quad (2a)$$

$$Re480A/Re550A - Re480B/Re550B > 0.10 \quad (2b)$$

The values of Re480A and Re550A satisfy preferably the formula (3a), more preferably the formula (3b) and most preferably the formula (3c).

$$1.30 < Re480A/Re550A \quad (3a)$$

$$1.45 < Re480A/Re550A \quad (3b)$$

$$1.60 < Re480A/Re550A \quad (3c)$$

The values of Re480B and Re550B satisfy preferably the formula (4a), more preferably the formula (4b) and most preferably the formula (4c).

$$Re480B/Re550B < 1.20 \quad (4a)$$

$$Re480B/Re550B < 1.15 \quad (4b)$$

$$Re480B/Re550B < 1.10 \quad (4c)$$

The first embodiment of the quarter wave plate can have a transparent support. If the support is oblong, the slow axis of the optically anisotropic layer A is preferably set at an angle of 40° to 50° with the longitudinal direction. The slow axis of the optically anisotropic layer B is also preferably set at an angle of 40° to 50° with the longitudinal direction. The angle between the longitudinal direction and the slow axis of the optically anisotropic layer A or B is within the range of preferably 41° to 49°, more preferably 42° to 48°, further preferably 43° to 47°, and most preferably 44° to 46°.

The oblong transparent support is generally in the form of a roll or a rectangular sheet. If the support is a roll, the longitudinal direction corresponds to winding direction. If the support is a rectangular sheet, the longitudinal direction is parallel to the long side of the oblong.

In the second embodiment, the angle between the slow axes in planes of the optically anisotropic layers A and B is set within the range of 50° to 70°, preferably 52° to 68°, more preferably 54° to 66°, furthermore preferably 55° to 65°, and most preferably 56° to 64°.

In the second embodiment, the retardation value of the optically anisotropic layer A measured at 550 nm is within the range of preferably 150 nm to 350 nm, more preferably 210 nm to 300 nm, further preferably 220 nm to 296 nm, further preferably 230 nm to 292 nm, furthermore preferably 240 nm to 288 nm, and most preferably 250 nm to 284 nm.

In the second embodiment, the retardation value of the optically anisotropic layer B measured at 550 nm is within the range of preferably 60 nm to 170 nm, more preferably 115 nm to 150 nm, further preferably 118 nm to 148 nm, further preferably 121 nm to 146 nm, furthermore preferably 122 nm to 144 nm, and most preferably 125 nm to 142 nm.

In the case that the optically anisotropic layer A is formed from liquid crystal molecules, the molecules may be twisted. The twist angle is preferably within the range of 3° to 45°.

The second embodiment of the quarter wave plate can have a transparent support. If the support is oblong, the slow axis of one of the optically anisotropic layers A and B is preferably set at an angle of 60° to 80° with the longitudinal direction. The slow axis of the other layer is also preferably set at an angle of 10° to 30° with the longitudinal direction. The angle between the longitudinal direction and the slow axis of one of the optically anisotropic layers A and B is within the range of preferably 64° to 79°, more preferably 68° to 78°, further preferably 72° to 77°, and most preferably 74° to 76°. The angle between the longitudinal direction and the slow axis of the other layer is within the range of preferably 11° to 26°, more preferably 12° to 22°, further preferably 13° to 18°, and most preferably 14° to 16°.

The oblong transparent support and the longitudinal direction of the second embodiment is the same as the those of the first embodiment described above.

[Quarter Wave Plate and Liquid Crystal Display]

FIG. 1 schematically illustrates an embodiment of a quarter wave plate.

The quarter wave plate shown in FIG. 1 has optical characteristics according to the second embodiment. The quarter wave plate of FIG. 1 comprises an optically anisotropic layer A (A) of polymer film and an optically anisotropic layer B (B) formed from discotic liquid crystal molecules, and the layers A and B are laminated. The angle (θ), in the same plane, between the slow axis (a) of the layer A and that (b) of the layer B is 60°.

The optically anisotropic layer A is made of a polymer film. The slow axis (a) of the layer A is parallel (or perpendicular) to the stretching direction of the film.

The optically anisotropic layer B comprises vertically aligned discotic liquid crystal molecules (d). The disc planes of the molecules (d) are parallel to the slow axis (b) of the layer B.

Figure 2:
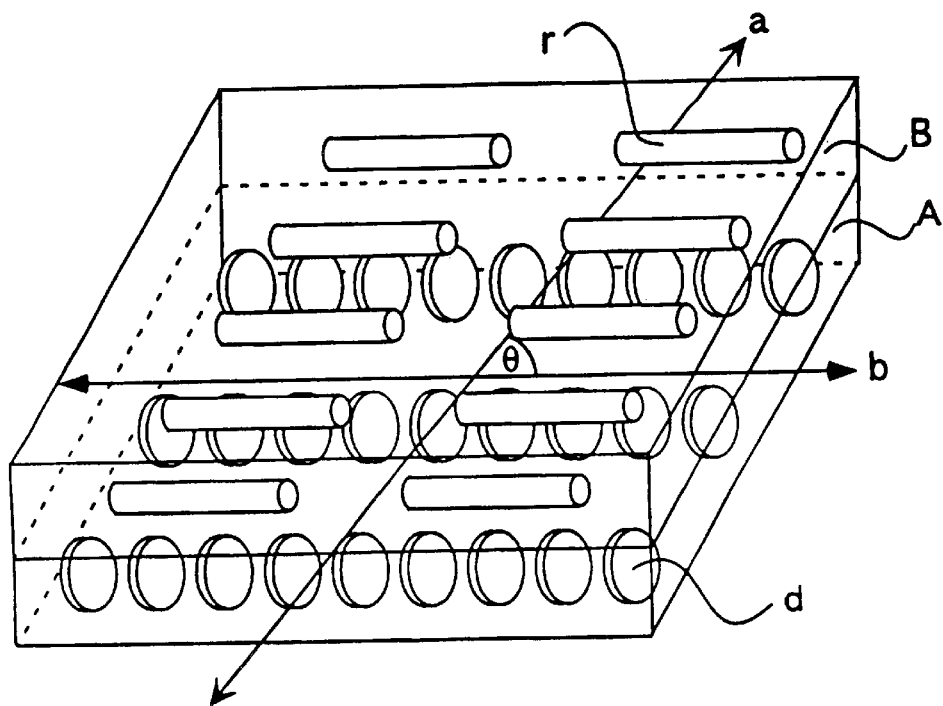
FIG. 2 schematically illustrates another embodiment of a quarter wave plate.

FIG. 2 schematically illustrates another embodiment of a quarter wave plate.

The quarter wave plate shown in FIG. 2 also has optical characteristics according to the second embodiment. The quarter wave plate of FIG. 2 comprises an optically anisotropic layer A (A) formed from discotic liquid crystal molecules and an-optically anisotropic layer B (B) formed from rod-like liquid crystal molecules, and the layers A and B are laminated. The angle (θ), in the same plane, between the slow axis (a) of the layer A and that (b) of the layer B is 60°.

The optically anisotropic layer A comprises vertically aligned discotic liquid crystal molecules (d). The disc planes of the molecules (d) are parallel to the slow axis (a) of the layer A.

The optically anisotropic layer B comprises horizontally aligned rod-like liquid crystal molecules (r). The long axes of the molecules (r) are parallel to the slow axis (b) of the layer B.

Figure 3:
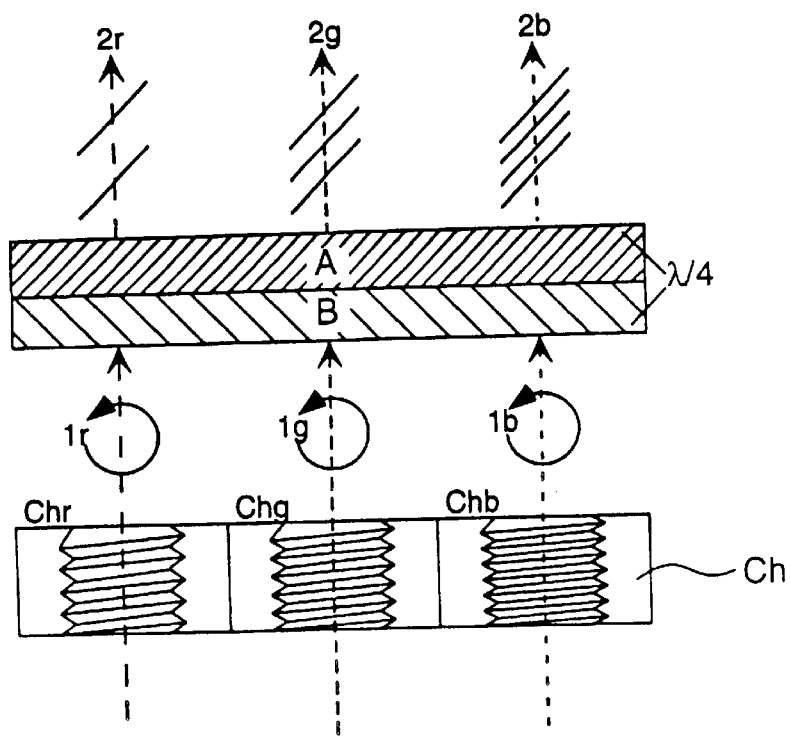
FIG. 3 is a sectional view schematically illustrating a relation between a cholesteric liquid crystal layer and a quarter wave plate.

FIG. 3 is a sectional view schematically illustrating a relation between a cholesteric liquid crystal layer and a quarter wave plate.

As shown in FIG. 3, the cholesteric liquid crystal layer (Ch) is divided into areas having different spiral pitches of cholesteric liquid crystal, namely red-transmitting area (Chr), green-transmitting area (Chg) and blue-transmitting area (Chb).

Light (1r, 1g, 1b) circularly (counterclockwise in FIG. 3) polarized in the direction opposite to the spiral (clockwise in FIG. 3) of the liquid crystal molecules in the cholesteric liquid crystal layer (Ch) passes through the layer (Ch), and on the other hand the layer (Ch) reflects light circularly (clockwise in FIG. 3) polarized in the same direction as the spiral of the liquid crystal molecules. Unlike usual reflection, the circularly polarized direction (clockwise in FIG. 3) of the reflected light is not changed by this reflection.

The quarter wave plate (λ/4) comprises the optically anisotropic layer A (A) and the optically anisotropic layer B (B) as described above for FIGS. 1 and 2. The quarter wave plate (λ/4) converts circularly polarized light (1r, 1g, 1b) into linearly polarized light (2r, 2g, 2b).

Figure 4:
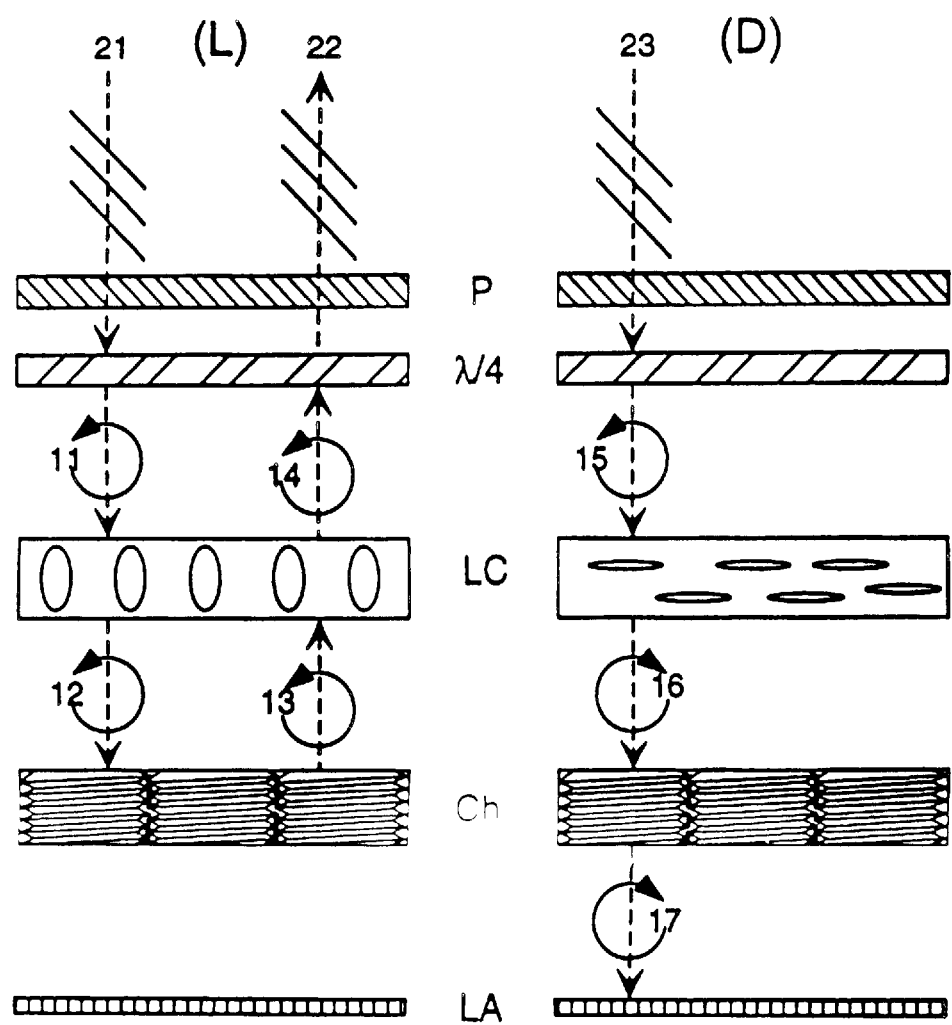
FIG. 4 is a sectional view schematically illustrating a liquid crystal display of a reflective type comprising a cholesteric liquid crystal layer and a quarter wave plate.

FIG. 4 is a sectional view schematically illustrating a liquid crystal display of a reflective type comprising a cholesteric liquid crystal layer and a quarter wave plate.

As shown in FIG. 4, the liquid crystal display comprises a light-absorbing layer (LA), a cholesteric liquid crystal layer (Ch), a liquid crystal cell (LC), a quarter wave plate (λ/4) and a linearly polarizing membrane (P) in order.

In the bright state (L), linearly polarized light coming from outside (21) passes through the linearly polarizing membrane (P), and further passes through the quarter wave plate (λ/4) to be converted into circularly polarized light (11). The liquid crystal cell (LC) optically works as a simple glass plate in this state, and hence the circularly polarized light (11) passes through the liquid crystal cell (LC) without changing its optical characteristics. The circularly polarized light (12) having passed through the liquid crystal cell (LC) is then reflected by the cholesteric liquid crystal layer (Ch). Unlike usual reflection, the circularly polarized direction of the reflected circularly polarized light (13) is not changed by this reflection. The reflected circularly polarized light (13) then passes through the liquid crystal cell (LC) without changing its optical characteristics. The circularly polarized light (14) having passed through the liquid crystal cell (LC) passes through the quarter wave plate (λ/4) to be converted into linearly polarized light (22), which then passes through the linearly polarizing membrane (P).

In the dark state (D), linearly polarized light coming from outside (23) also passes through the linearly polarizing membrane (P), and further passes through the quarter wave plate (λ/4) to be converted into circularly polarized light (15). The liquid crystal cell (LC) gives the same optical function as the quarter wave plate (λ/4) in this state, and hence the circularly polarized light (15) passes through the liquid crystal cell (LC) to be converted into light (16) circularly polarized in the opposite circular direction. The circularly polarized light (16) having passed through the liquid crystal cell (LC) then passes through the cholesteric liquid crystal layer (Ch). The circularly polarized light (17) having passed through the liquid crystal cell (LC) is absorbed by the light-absorbing layer (LA).

Figure 5:
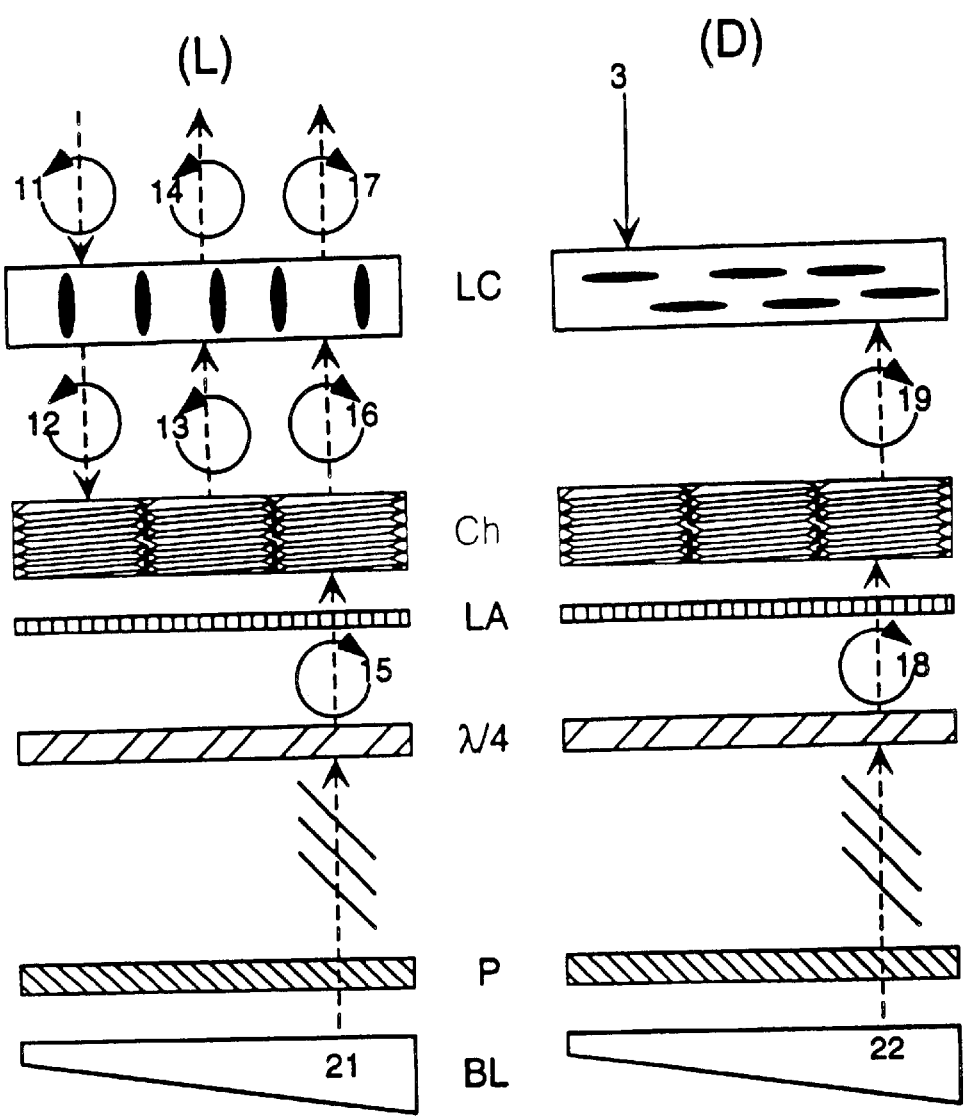
FIG. 5 is a sectional view schematically illustrating a liquid crystal display of a reflective and transmissive type comprising a cholesteric liquid crystal layer and a quarter wave plate.

FIG. 5 is a sectional view schematically illustrating a liquid crystal display of a reflective and transmissive type comprising a cholesteric liquid crystal layer and a quarter wave plate.

As shown in FIG. 5, the liquid crystal display comprises a backlight source (BL), a linearly polarizing membrane (P), a quarter wave plate (λ/4), a light-absorbing color filter (LA), a cholesteric liquid crystal layer (Ch) and a liquid crystal cell (LC) of GH mode in order.

The liquid crystal cell (LC) optically works as a simple glass plate in th e bright state (L), and hence circularly polarized light coming from outside (11) passes through the liquid crystal cell (LC) without changing its optical characteristics. The light is then reflected by the cholesteric liquid crystal layer (Ch), and the reflected circularly polarized light (13) passes through the liquid crystal cell (LC) without changing its optical characteristics, to be circularly polarized light (14).

In the bright state (L), linearly polarized light (21) coming from the backlight (BL) passes through the linearly polarizing membrane (P). The light then passes through the quarter wave plate (λ/4) to be converted into circularly polarized light (15). The circularly polarized light (15) passes through the cholesteric liquid crystal layer (Ch) without changing its optical characteristics, and then the circularly polarized light (16) having passed through the cholesteric liquid crystal layer (Ch) passes through the liquid crystal cell (LC) without changing its optical characteristics. Thus, the circularly polarized light (17) is obtained.

In the dark stat e (D), light coming from outside (3) does not pass through the liquid crystal cell (LC).

In the dark state (D), linearly polarized light (22) coming from the backlight (BL) passes through the linearly polarizing membrane (P). The light then passes through the quarter wave plate (λ/4) to be converted into circularly polarized light (18). The circularly polarized light (18) passes through the cholesteric liquid crystal layer (Ch) without changing its optical characteristics, but the circularly polarized light (19) having passed through the cholesteric liquid crystal layer (Ch) does not pass through the liquid crystal cell (LC).

Figure 6:
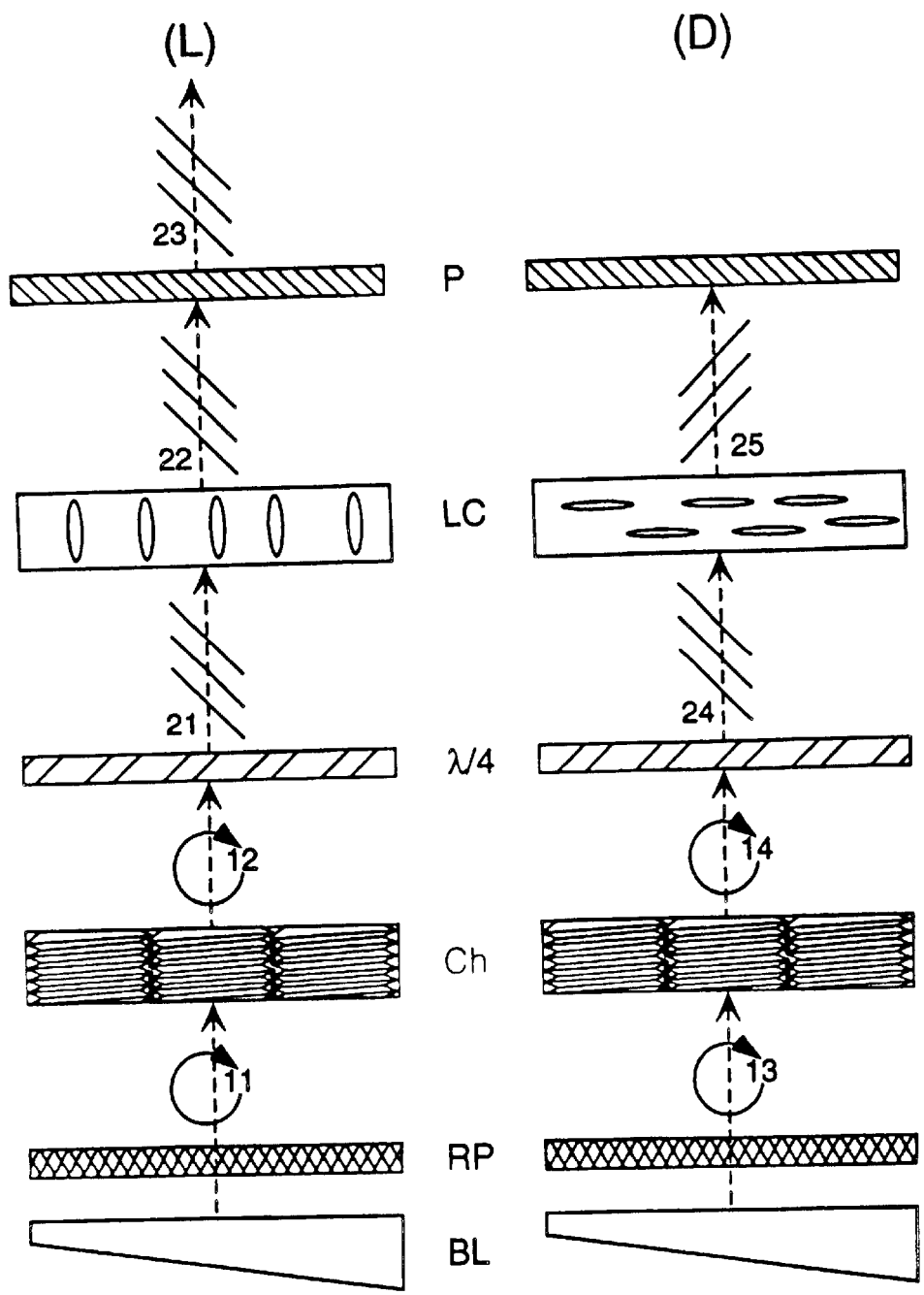
FIG. 6 is a sectional view schematically illustrating a liquid crystal display of a transmissive type comprising a cholesteric liquid crystal layer and a quarter wave plate.

FIG. 6 is a sectional view schematically illustrating a liquid crystal display of a transmissive type comprising a cholesteric liquid crystal layer and a quarter wave plate.

As shown in FIG. 6, the liquid crystal display comprises a backlight source (BL), a reflective polarizing plate (RP), a cholesteric liquid crystal layer (Ch), a quarter wave plate (λ/4), a liquid crystal cell (LC) of TN mode and a linearly polarizing membrane (P) in order.

In the bright state (L), the reflective polarizing plate (RP) selectively transmits circularly polarized light (11) coming from the backlight (BL). The circularly polarized light (11) passes through the cholesteric liquid crystal layer (Ch) without changing its optical characteristics. The circularly polarized light (12) having passed through the cholesteric liquid crystal layer (Ch) then passes through the quarter wave plate (λ/4) to be converted into linearly polarized light (21). The liquid crystal cell (LC) optically works as a simple glass plate in this state, and hence the linearly polarized light (21) passes through the liquid crystal cell (LC) without changing its optical characteristics. The linearly polarized light (22) having passed through the liquid crystal cell (LC) then passes through the linearly polarizing membrane (P) without changing its optical characteristics. Thus, the linearly polarized light (23) is obtained.

In the dark state (D), the reflective polarizing plate (RP) also selectively transmits circularly polarized light (13) coming from the backlight (BL). The circularly polarized light (13) passes through the cholesteric liquid crystal layer (Ch) without changing its optical characteristics. The circularly polarized light (14) having passed through the cholesteric liquid crystal layer (Ch) then passes through the quarter wave plate (λ/4) to be converted into linearly polarized light (24). The liquid crystal cell (LC) gives the same optical function as the quarter wave plate (λ/4) in this state, and hence the linearly polarized light (24) passes through the liquid crystal cell (LC) to be converted into light (25) linearly polarized at an angle of 90° to the polarizing axis of the light (24). The linearly polarized light (25) converted by the liquid crystal cell (LC) does not pass through the linearly polarizing membrane (P).

[Optically Anisotropic Layer Made of Polymer Film]

One of the optically anisotropic layers A and B may be made of a polymer film.

The polymer film is preferably formed from an optical anisotropic polymer. Examples of the polymers include polyolefins (e.g., polyethylene, polypropylene, norbornene polymer), polyvinyl alcohol, polymethacrylic ester, polyacrylic ester and cellulose ester. Also copolymers or mixtures of these polymers can be used.

The optical anisotropy of the film is preferably obtained by stretching. The stretching is preferably performed uniaxially. Further, the uniaxial stretching is preferably performed in the vertical uniaxial stretching process with two or more rolls rotating in different speeds or in the tenter stretching process in which the polymer film is nipped at both sides and stretched laterally. Two or more polymer films may be used so that the total optical characteristics of the films may satisfy the aforementioned conditions.

If the polymer film gives positive peculiar birefringence, the direction giving the maximum refractive index in plane of the film corresponds to the stretching direction. If the film gives negative peculiar birefringence, the direction giving the maximum refractive index in plane of the film is perpendicular to the stretching direction.

The polymer film is preferably formed by solvent-cast method to avoid unevenness of the birefringence.

The thickness of the polymer film is within the range of preferably 20 to 500 nm, more preferably 50 to 200 nm and most preferably 50 to 100 nm.

[Optically Anisotropic Layer Formed from Liquid Crystal]

At least one of the optically anisotropic layers A and B is preferably formed from liquid crystal molecules, and more preferably both layers are formed from liquid crystal molecules. The liquid crystal molecules are preferably discotic or rod-like liquid crystal molecules. Particularly preferably, one of the layers A and B is formed from discotic liquid crystal molecules and the other is formed from rod-like liquid crystal molecules.

Preferably, the liquid crystal molecules are essentially homogeneously aligned. More preferably they are fixed with their homogeneous alignment maintained, and most preferably they are fixed by a polymerization reaction.

In the case that discotic liquid crystal molecules are used, the molecules are preferably vertically aligned. An average inclined angle of the discotic liquid crystal molecules is preferably in the range of 50° to 90°. The discotic liquid crystal molecules can also be obliquely aligned (an oblique alignment). The inclined angle of the discotic liquid crystal molecule can be gradually changed (a hybrid alignment). The average inclined angle is preferably in the range of 50° to 90°, even if discotic liquid crystal molecules are aligned according to the oblique alignment or the hybrid alignment.

The discotic liquid crystal molecule is described in various documents (C. Destrade et al, Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)). The polymerization reaction of the discotic liquid crystal molecule is described in Japanese Patent Provisional Publication No. 8(1996)-27284.

For fixing the aligned discotic liquid crystal molecules by a polymerization reaction, a polymerizable group should be bound to a discotic core of the discotic liquid crystal molecule. However, if the polymerizable group is directly bound to the discotic core, it is difficult to keep the alignment through the polymerization reaction. Therefore, a linking group is introduced between the discotic core and the polymerizable group. Accordingly, the discotic liquid crystal molecule having a polymerizable group (polymerizable discotic liquid crystal molecule) preferably is represented by the following formula (I).

$$D(-L-Q)_n \qquad (I)$$

In the formula (I), D is a discotic core; L is a divalent linking group; Q is a polymerizable group; and n is an integer of 4 to 12.

Examples of the discotic cores (D) are shown below. In the examples, LQ (or QL) means the combination of the divalent linking group (L) and the polymerizable group (Q).
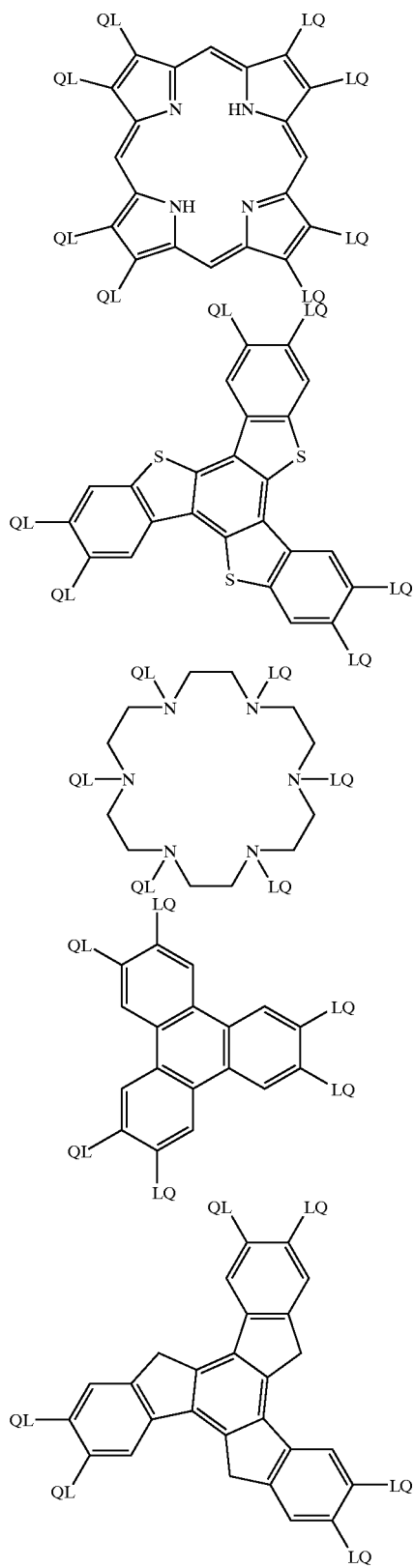
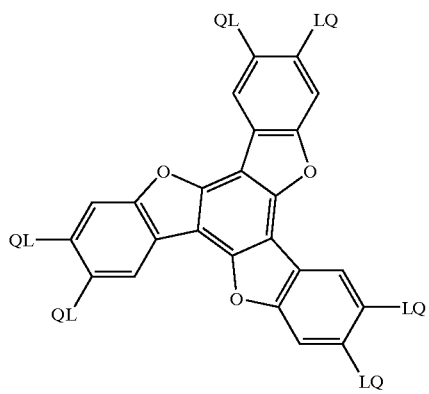
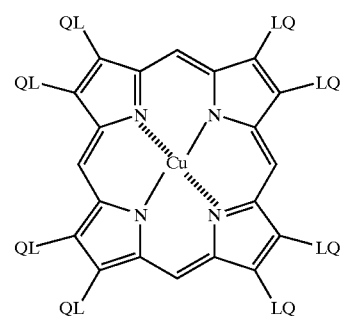
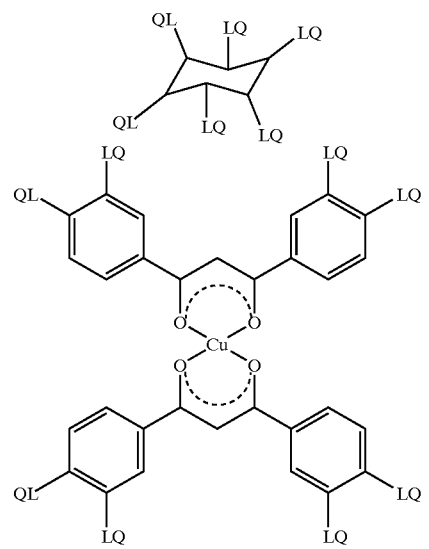
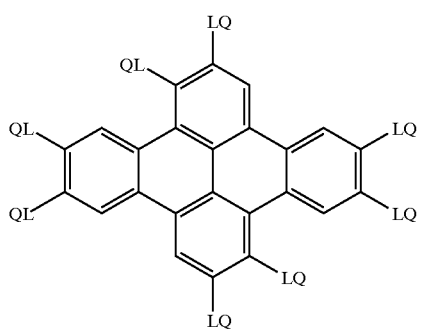

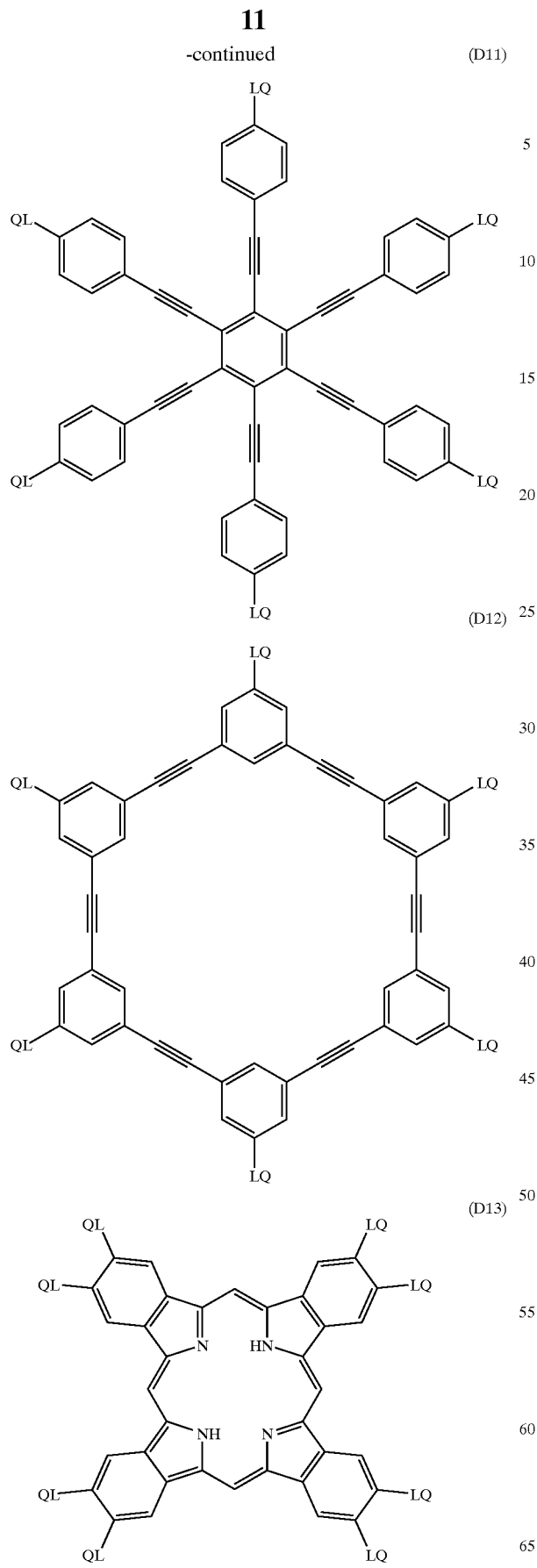
(D11)
(D12)
(D13)

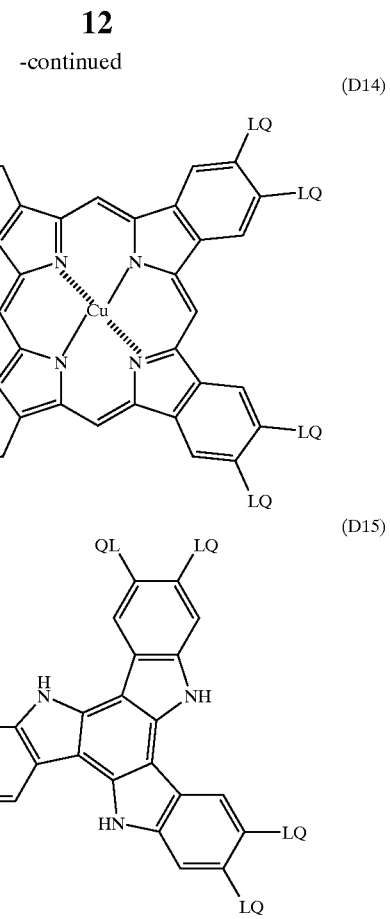
(D14)
(D15)

In the formula (I), the divalent linking group (L) preferably is selected from the group consisting of an alkylene group, an alkenylene group, an arylene group, —CO, —NH—, —O—, —S— and combinations thereof. L more preferably is a divalent linking group comprising at least two divalent groups selected from the group consisting of an alkylene group, an alkenylene group, an arylene group, —CO—, —NH—, —O— and —S—. L further preferably is a divalent linking group comprising at least two divalent groups selected from the group consisting of an alkylene group, an alkenylene group, an arylene group, —CO—and —O—. The alkylene group preferably has 1 to 12 carbon atoms. The alkenylene group preferably has 2 to 12 carbon atoms. The arylene group preferably has 6 to 10 carbon atoms. The alkylene group, the alkenylene group and the arylene group can have a substituent group (such as an alkyl group, a halogen atom, cyano, an alkoxy group, an acyloxy group).

Examples of the divalent linking groups (L) are shown below; In the examples, the left side is attached to the discotic core (D), and the right side is attached to the polymerizable group (Q). The AL means an alkylene group or an alkenylene group. The AR means an arylene group.

L1: —AL—CO—O—AL—
L2: —AL—CO—O—AL—O—
L3: —AL—CO—O—AL—O—AL—
L4: —AL—CO—O—AL—O—CO—
L5: —CO—AR—O—AL—
L6: —CO—AR—O—AL—O—
L7: —CO—AR—O—AL—O—CO—

L8: —CO—NH—AL—
L9: —NH—AL—O—
L10: —NH—AL—O—CO—
L11: —O—AL—
L12: —O—AL—O—
L13: —O—AL—O—CO—
L14: —O—AL—O—CO—NH—AL—
L15: —O—AL—S—AL—
L16: —O—CO—AL—AR—O—AL—O—CO—
L17: —O—CO—AR—O—AL—CO—
L18: —O—CO—AR—O—AL—O—CO—
L19: —O—CO—AR—O—AL—O—AL—O—CO—
L20: —O—CO—AR—O—AL—O—AL—O—AL—O—CO—
L21: —S—AL—
L22: —S—AL—O—
L23: —S—AL—O—CO—
L24: —S—AL—S—AL—
L25: —S—AR—AL—

The polymerizable group (Q) is determined according to the polymerization reaction. Examples of the polymerizable groups (Q) are shown below.

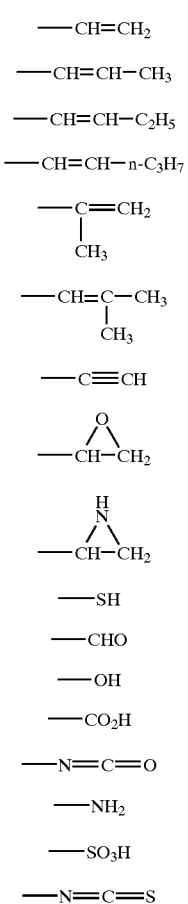

The polymerizable group (Q) preferably is an unsaturated polymerizable group (Q1 to Q7) or an epoxy group (Q8), more preferably is an unsaturated polymerizable group, and most preferably is an ethylenically unsaturated group (Q1 to Q6).

In the formula (I), n is an integer of 4 to 12, which is determined by the chemical structure of the discotic core (D). The 4 to 12 combinations of L and Q can be different from each other. However, the combinations are preferably identical.

The discotic liquid crystal molecules in the optically anisotropic layer may be spirally twisted. The twist angle is preferably within the range of 3° to 45°. For spirally twisting the molecules, an asymmetric carbon may be introduced into AL (an alkylene group or an alkenylene group) in the aforementioned linking group (L)

In place of introducing an asymmetric carbon atom into the divalent linking group (L) of the discotic liquid crystal molecule, the molecules can also be spirally twisted by adding an optical active compound containing an asymmetric carbon atom (chiral agent) into the optically anisotropic layer. Various natural or synthetic optical active compounds can be used as the chiral agent. The chiral agent can have a polymerizable group, which is the same as or similar to the polymerizable group of the discotic liquid crystal compound. The discotic liquid crystal molecules are fixed in the optically anisotropic layer by a polymerization reaction after the molecules are essentially vertically (homogeneously) aligned. At the same time, the chiral agent having a polymerizable group can also be fixed by the same or a similar polymerization reaction.

Two or more discotic liquid crystal molecules can be used in combination. For example, a molecule containing an asymmetric carbon atom in the divalent linking group (L) can be used in combination with a molecule containing no asymmetric carbon atom.

In the case that rod-like liquid crystal molecules are used, it is preferred that the molecules be essentially horizontally (homogeneously) aligned. Here, 'essentially horizontally (homogeneously) aligned' mean that the average inclined angle of the rod-like liquid crystal molecules is within the range of 0° to 40°, in which the inclined angle of the rod-like liquid crystal molecules means an angle between a long axis of a rod-like liquid crystal molecule and a surface plane of the optically anisotropic layer. The rod-like liquid crystal molecules can also be obliquely aligned (an oblique alignment), or the inclined angle of the rod-like liquid crystal molecules can be gradually changed (a hybrid alignment). The average inclined angle is preferably in the range of 0° to 40°, even if the liquid crystal molecules are aligned according to the oblique alignment or the hybrid alignment.

Examples of the rod-like liquid crystal molecules include azomethines, azoxys, cyanobiphenyls, cyanophenyl esters, benzoic esters, phenyl cyclohexanecarboxylates, cyanophenylcyclohexanes, cyano-substituted phenylpyrimidines, alkoxyl-substituted phenylpyrimidines, phenyldioxanes, tolanes and alkenylcyclohexylbenzonitriles. Besides these relatively low-molecular weight compounds, polymers of rod-like liquid crystal molecules can also be used in an optically anisotropic layer.

Particularly preferably, in the same manner as described for the discotic liquid crystal molecules, a polymerizable group (Q) is introduced to the rod-like liquid crystal molecule so that the molecules may be fixed by a polymerization reaction with their horizontal alignment maintained.

Each optically anisotropic layer has a thickness of preferably 100 nm to 10 μm, more preferably 500 nm to 10 μm, most preferably 2 to 8 μm.

The total thickness of the optically anisotropic layers A and B is in the range of 500 nm to 20 μm, preferably 600 nm to 15 μm.

[Orientation Layer]

For essentially vertically aligning the discotic liquid crystal molecules, it is important to reduce a surface energy of an orientation layer. In detail, a functional group decreases the surface energy to align the discotic liquid crystal molecules vertically. A hydrocarbon group containing 10 or more carbon atoms can be effectively used as the functional group. Fluorine atom can also be effectively used as the functional group. The hydrocarbon group containing 10 or more carbon atoms is particularly preferred. The hydrocarbon group or fluorine atom is introduced into a side chain of a polymer rather than a main chain, to arrange the hydrocarbon group or the fluorine atom on the surface of the orientation layer.

In the case that fluorine atoms are introduced into the polymer to reduce the surface energy, the polymer contains the fluorine atoms preferably in an amount of 0.05 to 80 wt. %, more preferably in an amount of 0.1 to 70 wt. %, further preferably in an amount of 0.5 to 65 wt. %, and most preferably in an amount of 1 to 60 wt. %.

The hydrocarbon group is an aliphatic group, an aromatic group or a combination thereof. The aliphatic group can have a branched, cyclic or linear structure. The aliphatic group preferably is an alkyl group (including a cycloalkyl group) or an alkenyl group (including a cycloalkenyl group). The aliphatic group preferably has a steroid structure. In the present specification, the steroid structure means a cyclopentanohydrophenanthrene ring or a ring obtained by replacing a single bond of the cyclopentanohydrophenanthrene ring with a double bond so long as the ring is aliphatic (not forming an aromatic ring). The aromatic group preferably has a biphenyl or tolan structure.

The hydrocarbon group can have a substituent group that is not strongly hydrophilic, such as a halogen atom. The hydrocarbon group contains preferably 10 to 100 carbon atoms, more preferably 10 to 60 carbon atoms, and most preferably 10 to 40 carbon atoms.

The polymer preferably has a main chain of a polyimide, polyvinyl alcohol or poly(meth)acrylic acid structure.

The polyimide is usually synthesized by a condensation reaction of tetracarboxylic acid and diamine. Two or more tetracarboxylic acids, or two or more diamines can be used to synthesize a copolymerized polyimide. The hydrocarbon group can be present in repeating units derived from the tetracarboxylic acids, in repeating units derived from the diamines or in both of them. The fluorine atom can also be present in the tetracarboxylic acid repeating units, in the diamine repeating units or in both of them.

In the case that the hydrocarbon group is introduced into the polyimide, the polymer preferably has a steroid structure in its side chain or its main chain.

The polyimide orientation layer may be prepared by applying a polyamic acid coating solution and then promoting a reaction for forming imide bonds.

The polyvinyl alcohol is generally prepared by saponification of polyvinyl acetate, and a denatured polyvinyl alcohol preferably used for the orientation layer is prepared (denatured) by introducing a fluorine atom-containing group or a hydrocarbon group into repeating units derived by the saponification.

The denatured polyvinyl alcohol comprises the repeating unit containing the fluorine atom or the hydrocarbon group in an amount of preferably 2 to 80 mol. %, more preferably 3 to 70 mol. %. The amount of the polyvinyl alcohol repeating unit in the denatured polyvinyl alcohol is in the range of preferably 20 to 95 mol. %, more preferably 25 to 90 mol. %. The amount of the polyvinyl acetate repeating unit in the denatured polyvinyl alcohol is in the range of preferably 0 to 30 mol. %, more preferably 2 to 20 mol. %.

It is preferred that the main chain and the fluorine atom-containing group or the hydrocarbon group in the denatured polyvinyl alcohol be connected not directly but through a divalent linking group selected from the group consisting of —O—, —CO—, —SO$_2$—, —NH—, an alkylene group, an arylene group and a combination thereof.

The denatured poly(meth)acrylic acid preferably used for the orientation layer is prepared (denatured) by introducing the fluorine atom-containing group or the hydrocarbon group into a part of poly(meth)acrylic acid repeating units.

The denatured poly(meth)acrylic acid comprises the re-peating unit containing the fluorine atom or the hydrocarbon group in an amount of preferably 2 to 80 mol. %, more preferably 3 to 70 mol. %. The amount of the (meth) acrylic acid repeating unit in the denatured poly(meth) acrylic acid is in the range of preferably 20 to 98 mol. %, more preferably 30 to 97 mol. %.

It is preferred that the main chain and the fluorine atom-containing group or the hydrocarbon group in the denatured poly(meth)acrylic acid be connected not directly but through a divalent linking group selected from the group consisting of —O—, —CO—, —SO$_2$—, —NH—, an alkylene group, an arylene group and a combination thereof.

In contrast to the above-described orientation layer for vertical alignment, it is important not to reduce a surface energy of an orientation layer for essentially horizontally aligning rod-like liquid crystal molecules. In detail, it is preferred not to introduce a functional group decreasing the surface energy (e.g., a hydrocarbon group having 10 or more carbon or fluorine atoms) into the polymer. In other words, known orientation layers for rod-like liquid crystal molecules can be used.

The known orientation layers are described in various publications, such as S. Matsumoto, Liquid crystal display techniques (written in Japanese), pp. 196–201(1996). Further, many orientation layers for liquid crystal cells are commercially available. In the present invention, such known or commercially available orientation layers can be used as the orientation layer for horizontal alignment of rod-like liquid crystal molecules.

It is also possible to horizontally align the rod-like liquid crystal molecules without the orientation layer. For example, in the case that an optically anisotropic layer comprising rod-like liquid crystal molecules is provided on an optically anisotropic layer comprising discotic liquid crystal molecules, the latter layer can function as the orientation layer. Otherwise, before a coating liquid of rod-like liquid crystal molecules is applied on a temporary support (described below), the temporary support or an intermediate layer (described below) may be subjected to rubbing treatment so that it may function as the orientation layer.

The polymer used in the orientation layer has a polymerization degree preferably in the range of 200 to 5,000, and more preferably in the range of 300 to 3,000. The polymer has a molecular weight preferably in the range of 9,000 to 200,000, and more preferably in the range of 13,000 to 130,000.

Two or more polymers can be used in combination.

The orientation layer is preferably formed by rubbing the polymer layer. The rubbing treatment can be conducted by rubbing a layer with paper or cloth several times along a certain direction.

[Preparation of Quarter Wave Plate]

The optically anisotropic layer is prepared by coating a temporary support or an intermediate layer on the temporary support with a coating solution containing liquid crystal molecules, the following polymerization initiator and other additives.

As the temporary support, a glass plate or a polymer film is preferably used. Preferably, a thermoplastic resin layer is provided between the temporary support and the optically anisotropic layer or between the temporary support and the orientation layer, so that the formed optically anisotropic layer may be easily peeled from the temporary support. The thermoplastic resin preferably soften or become adherent at 150° C. or below. Further, it is preferred that the resin be easily soluble in a particular solvent (e.g., alkali aqueous solution) to be easily removed. Thermoplastic resins soluble in alkali aqueous solutions are proposed in the field of photosensitive transferring material (e.g., in Japanese Patent Provisional Publication Nos. 5(1993)-72724 and 5(1993)-173320). These resins can be used for preparing the quarter wave plate of the invention.

For improving the adhesion between the thermoplastic resin layer and the optically anisotropic layer, an intermediate layer may be provided.

A solvent for the preparation of the coating solution preferably is an organic solvent. Examples of the organic solvents include amides (e.g., N,N-dimethylformamide), sulfoxides (e.g., dimethylsulfoxide), heterocyclic compounds (e.g., pyridine), hydrocarbons (e.g., benzene, hexane), alkyl halides (e.g., chloroform, dichloromethane), esters (e.g., methyl acetate, butyl acetate), ketones (e.g., acetone, methyl ethyl ketone) and ethers (e.g., tetrahydrofuran, 1,2-dimethoxyethane). Alkyl halides and ketones are preferred. Two or more organic solvents can be used in combination.

The coating solution can be coated according to a conventional coating method such as an extrusion coating method, a direct gravure coating method, a reverse gravure coating method, a die coating method or a bar coating method.

After applying the coating solution, the aligned liquid crystal molecules are fixed with the alignment maintained. The liquid crystal molecules are preferably fixed by a polymerization reaction of the polymerizable groups (Q) introduced in the molecules. The polymerization reaction can be classified into a thermal reaction using a thermal polymerization initiator and a photo reaction using a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted aromatic acyloin compounds (described in U.S. Pat. No. 2,722,512), polycyclic quinone compounds (described in U.S. Pat. Nos. 2,951,758, 3,046,127), combinations of triarylimidazole dimers and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5 to 5 wt. % based on the solid content of the coating solution of the layer.

The light irradiation for the photo polymerization is preferably conducted by an ultraviolet ray.

The exposure energy is preferably in the range of 20 to 50,000 mJ/cm$^2$, and more preferably in the range of 100 to 800 mJ/cm$^2$. The light irradiation can be conducted whole heating the layer to accelerate the photo polymerization reaction.

The aforementioned procedures of coating, aligning and hardening are repeated to prepare a quarter wave plate comprising the optically anisotropic layers A and B.

After peeled from the temporary support, the quarter wave plate is used. In the case that the quarter wave plate is placed in the liquid crystal cell, the formed quarter wave plate is transferred from the temporary support onto one substrate of the cell.

The quarter wave plate can be peeled or transferred from the orientation layer and the thermoplastic resin layer, which now come into disuse. If the aligned liquid crystal molecules are fixed by a polymerization reaction with the alignment maintained, now the molecules can keep the alignment without the orientation layer.

[Cholesteric Liquid Crystal Layer]

Selective reflection of cholesteric liquid crystal has been well known, and is described in various publications. Japanese Patent Provisional Publication Nos. 8(1996)-234196, 8(1996)-297280, 10(1998)-177167 and 10(1998)-260387 disclose a cholesteric liquid crystal layer (for a color filter of liquid crystal display) divided into plural areas having different spiral pitches of cholesteric liquid crystal.

[Liquid Crystal Display]

The combination of the quarter wave plate and the cholesteric liquid crystal layer can be effectively used in liquid crystal displays of various modes. Examples of the display modes include TN (twisted nematic) mode, IPS (in plane switching) mode, FLC (ferroelectric liquid crystal) mode, OCB (optically compensatory bend) mode, STN (super twisted nematic) mode, VA (vertically aligned) mode, ECB (electrically controlled birefringence) mode, HAN (hybrid aligned nematic) mode and GH (guest host) mode.

The liquid crystal display of the present invention can use known other components (e.g., liquid crystal cell, linearly polarizing membrane, backlight) of a conventional liquid crystal display.

EXAMPLE 1

[Preparation of Optically Anisotropic Layer A]

A polycarbonate film was stretched to prepare an optically anisotropic layer A having the retardation value of 274 nm at 550 nm.

[Preparation of Optically Anisotropic Layer B]

A diluted solution of a polyamic acid denatured with steroid was coated on the optically anisotropic layer A by means of a bar coater to form a layer of 1 μm thickness, and air-dried at 60° C. for 2 minutes. The surface was subjected to a rubbing treatment to form an orientation layer comprising the following denatured polyimide. The angle between the rubbing direction and the slow axis of the optically anisotropic layer A was 60°.

Denatured polyimide (repeating unit)

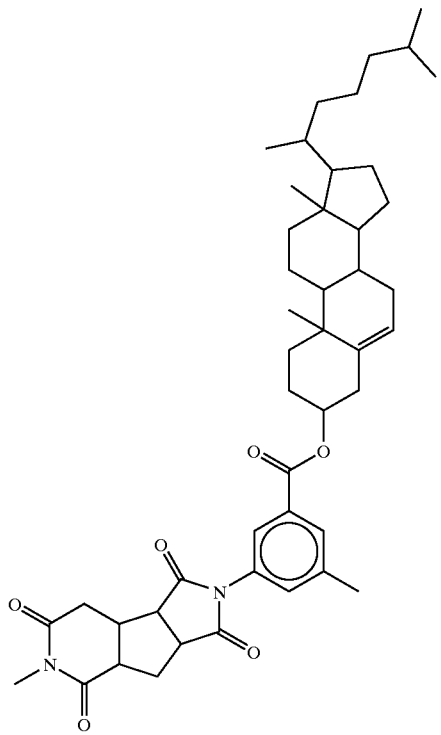

On the formed orientation layer, the following coating solution was coated to form a layer having 6.2 μm thickness. The layer was irradiated with an ultraviolet ray to polymerize the vertically aligned discotic liquid crystal molecules. Thus, an optically anisotropic layer B was formed.

The retardation value of the optically anisotropic layer B was measured at 550 nm to find 137 nm.

Thus, a quarter wave plate was prepared. The retardation value measured at 480 nm was 118 nm (Re/λ: 0.246), the retardation value measured at 550 nm was 137.50 nm (Re/λ: 0.250), and the retardation value measured at 630 nm was 159 nm (Re/λ: 0.252).

| Coating solution for optically anisotropic layer B | |
|---|---|
| The following discotic liquid crystal molecule (1) | 32.6 wt. % |
| Cellulose acetate butyrate | 0.7 wt. % |
| The following denatured trimethylolpropane triacrylate | 3.2 wt. % |
| The following sensitizer | 0.4 wt. % |
| The following photopolymerization initiator | 1.1 wt. % |
| Methyl ethyl ketone | 62.0 wt. % |

-continued

Coating solution for optically anisotropic layer B

Discotic liquid crystal compound (1)

R: —O—CO—C$_6$H$_4$—O—(CH$_2$)$_4$—O—CO—CH=CH$_2$

Denatured trimethylolpropane triacrylate

CH$_2$—(CO$_2$H$_4$)$_l$—O—CO—CH=CH$_2$
C$_2$H$_5$—C—CH$_2$—(CO$_2$H$_4$)$_{\overline{m}}$—O—CO—CH=CH$_2$
CH$_2$—(CO$_2$H$_4$)$_{\overline{n}}$—O—CO—CH=CH$_2$
l + m + n = 3.5

Sensitizer

Photopolymerization initiator

[Preparation of Circularly Polarizing Plate]

A polarizing plate comprising a linearly polarizing membrane and a protective film was laminated on the optically anisotropic layer A side of the quarter wave plate, so that the polarizing axis of the linearly polarizing membrane might be set at angles of 15° and 75° to the slow axes of the optically anisotropic layers A and B on the same plane, respectively. Thus, a circularly polarizing plate is prepared.

[Preparation of Liquid Crystal Display]

After subjected to ultrasonic cleaning, a glass substrate was spin-coated with polyimide orientation layer material (LX-1400, Hitachi Chemicals-Du Pont). The applied layer was dried at 80° C. for 20 minutes, and then further heated at 250° C. for 60 minutes. After the formed orientation layer was subjected to rubbing treatment, the following cholesteric liquid crystal B ink was spin-coated and heated at 120° C. for 10 minutes to align the liquid crystal molecules.

| Cholesteric liquid crystal B ink | |
|---|---|
| The following rod-like liquid crystal molecules (1) | 87.0 weight parts |
| The following rod-like liquid crystal molecules (2) | 10.0 weight parts |
| The photopolymerizatton initiator | 3.0 weight parts |
| Chloroform | 400.0 weight parts |

Rod-like liquid crystal molecule (1)

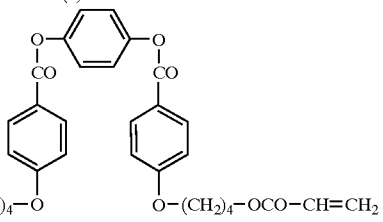

$CH_2\!=\!CH\!-\!COO\!-\!(CH_2)_4\!-\!O$ $\quad\quad O\!-\!(CH_2)_4\!-\!OCO\!-\!CH\!=\!CH_2$ Rod-like liquid crystal molecule (2)

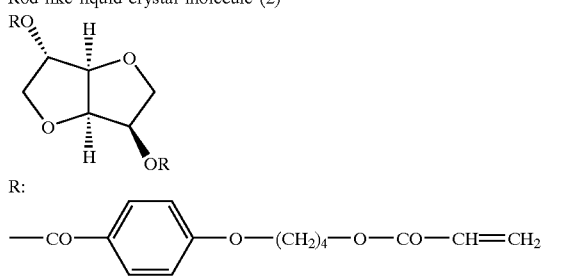

R:

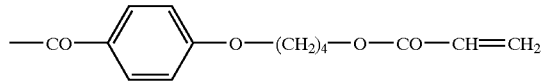

The layer of the liquid crystal B ink was exposed to ultraviolet light through a photomask, and then subjected to solvent development and rinse treatment to prepare a blue-selective reflection color filter (width: 100 μm, pitch: 300 μm).

The above procedure was repeated except that the following cholesteric liquid crystal G ink was used in place of the cholesteric liquid crystal B ink, to prepare a green-selective reflection color filter.

| Cholesteric liquid crystal G ink | |
|---|---|
| The rod-like liquid crystal molecules (1) | 88.5 weight parts |
| The rod-like liquid crystal molecules (2) | 8.5 weight parts |
| The photopolymerization initiator | 3.0 weight parts |
| Chloroform | 400.0 weight parts |

Further, the procedure was repeated except that the following cholesteric liquid crystal R ink was used in place of the cholesteric liquid crystal B ink, to prepare a Red-selective reflection color filter.

| Cholesteric liquid crystal R ink | |
|---|---|
| The rod-like liquid crystal molecules (1) | 90.0 weight parts |
| The rod-like liquid crystal molecules (2) | 7.0 weight parts |
| The photopolymerization initiator | 3.0 weight parts |
| Chloroform | 400.0 weight parts |

Post-bake treatment was performed at 250° C. for 10 minutes to prepare a three-color filter substrate.

The three-color filter substrate was exposed to each of clockwise and counterclockwise circularly polarized light, and the reflected light was observed by a microscope. When the clockwise circularly polarized light was applied, a colored reflection image was observed from each pixel. On the other hand, when the counterclockwise circularly polarized light was applied, reflected light was not observed. Thus, it was confirmed that a color filter was formed on the substrate.

An ITO layer was formed on the three-color filter substrate by sputtering, and then subjected to etching treatment to make a striped pattern. The striped ITO layer was spin-coated with polyimide orientation layer material for vertical alignment (SE-7511L, Nissan Chemicals Co., Ltd.). The formed layer was dried at 80° C. for 20 minutes, and further heated at 180° C. for 60 minutes to form an orientation layer. The orientation layer was subjected to rubbing treatment.

A striped electrode of ITO and a polyimide orientation layer were formed on another substrate, in the same manner as described above. The orientation layer was subjected to rubbing treatment. The treated substrate and the three-color filter substrate were laminated so that the orientation layers might face each other and so that their rubbing directions might be reversely parallel. In this lamination, thermosetting epoxy resin containing spherical spacers (diameter: 6 μm) was used.

Liquid crystal of n-type (ZLI-4318, Merck Japan Co., Ltd.) was charged between the substrates, and the edges were sealed.

On the substrate not having the three-color filter, the above-prepared circularly polarizing plate was laminated with an adhesive. Thus, a liquid crystal display having the structure shown in FIG. 4 was prepared.

When voltage was applied, the liquid crystal display gave a color image with high contrast.

EXAMPLE 2

[Preparation of Optically Anisotropic Layer A]

A diluted solution of a polyamic acid denatured with steroid was coated on a transparent glass substrate (thickness: 1.1 mm) by means of a bar coater. The formed layer was heated at 200° C. for.1 hour, and the surface was subjected to a rubbing treatment to form an orientation layer comprising the denatured polyimide of Example 1.

By thickening the coating solution for optically anisotropic layer B of Example 1 by adding the solutes, a coating solution for optically anisotropic layer A was prepared. The prepared solution was applied on the orientation layer to vertically align the discotic liquid crystal molecules, and exposed to ultraviolet light to polymerize the discotic liquid crystal molecules. Thus, an optically anisotropic layer A was formed.

The retardation value of the optically anisotropic layer A was measured at 550 nm to find 265 nm.

[Preparation of Optically Anisotropic Layer B]

A polyvinyl alcohol orientation layer (thickness: 0.1 μm) was formed on the optically anisotropic layer A by spin-coating method. The surface of the orientation layer was subjected to rubbing treatment in which the rubbing direction was set at an angle of 60° to the slow axis of the optically anisotropic layer A.

On the orientation layer, a coating solution comprising 91 wt. % of the rod-like liquid crystal molecules (1) used in Example 1, 5 wt. % of the denatured trimethylol-propane triacrylate used in Example 1, 1 wt. % of the sensitizer in Example 1 and 3 wt. % of the photopolymerization initiator dissolved in methylene chloride was coated and heated at 115° C. to align the rod-like liquid crystal molecules horizontally. Ultraviolet light was then applied to polymerize the rod-like liquid crystal molecules. Thus, an optically anisotropic layer B was formed.

The retardation value of the optically anisotropic layer B was measured at 550 nm to find 139 nm.

Thus, a quarter wave plate was prepared. The retardation value measured at 480 nm was 119 nm (Re/λ: 0.248), the retardation value measured at 550 nm was 138 nm (Re/λ: 0.251), and the retardation value measured at 630 nm was 155 nm (Re/λ: 0.246).

[Preparation of Liquid Crystal Display]

The procedure of Example 1 was repeated except that the above-prepared quarter wave plate was used, to prepare a circularly polarizing plate and a liquid crystal display.

When voltage was applied to the prepared liquid crystal display, a color image with high contrast was displayed.

EXAMPLE 3

[Preparation of Liquid Crystal Display]

After a glass substrate was subjected to alkali ultrasonic cleaning, a light-absorbing color filter having patterned RGB was prepared from a photosensitive pigment dispersion (color mosaic, Fuji Film Aurin Co., Ltd.). Polyimide orientation layer material (LX-1400, Hitachi Chemicals-Du Pont) was then applied by spin-coating method. The applied layer was dried at 80° C. for 20 minutes, and then further heated at 250° C. for 60 minutes. After the formed orientation layer was subjected to rubbing treatment, the following cholesteric liquid crystal B ink was spin-coated and heated at 120° C. for 10 minutes to align the liquid crystal molecules.

| Cholesteric liquid crystal B ink | |
|---|---|
| The rod-like liquid crystal molecules (1) used in Example 1 | 42.0 weight parts |
| The following rod-like liquid crystal molecules (3) | 42.0 weight parts |
| The rod-like liquid crystal molecules (2) used in Example 1 | 12.0 weight parts |
| The photopolymerization initiator used in Example 1 | 3.0 weight parts |
| Chloroform | 400.0 weight parts |

Rod-like liquid crystal molecule (3)

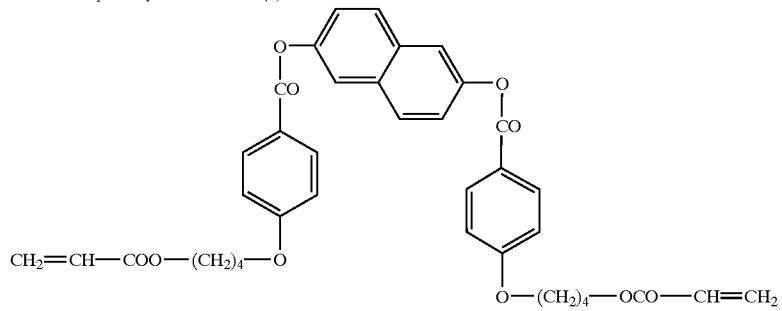

The layer of the liquid crystal B ink was exposed to ultraviolet light through a photomask, and then subjected to solvent development and rinse treatment to prepare a blue-selective reflection color filter (width: 100 μm, pitch: 300 μm).

The above procedure was repeated except that the following cholesteric liquid crystal G ink was used in place of the cholesteric liquid crystal B ink, to prepare a green-selective reflection color filter.

| Cholesteric liquid crystal G ink | |
|---|---|
| The rod-like liquid crystal molecules (1) used in Example 1 | 43.0 weight parts |
| The rod-like liquid crystal molecules (3) | 43.0 weight parts |
| The rod-like liquid crystal molecules (2) used in Example 1 | 10.0 weight parts |
| The photopolymerization initiator used in Example 1 | 3.0 weight parts |
| Chloroform | 400.0 weight parts |

Further, the procedure was repeated except that the following cholesteric liquid crystal R ink was used in place of the cholesteric liquid crystal B ink, to prepare a red-selective reflection color filter.

| Cholesteric liquid crystal R ink | |
|---|---|
| The rod-like liquid crystal molecules (1) used in Example 1 | 44.0 weight parts |
| The rod-like liquid crystal molecules (3) | 44.0 weight parts |
| The rod-like liquid crystal molecules (2) used in Example 1 | 8.5 weight parts |
| The photopolymerization initiator used in Example 1 | 3.0 weight parts |
| Chloroform | 400.0 weight parts |

Post-bake treatment was performed at 250° C. for 10 minutes to prepare a three-color filter substrate.

An ITO layer was formed on the three-color filter substrate by sputtering, and then subjected to etching treatment to make a striped pattern. The striped ITO layer was spin-coated with polyimide orientation layer material for vertical alignment (SE-7511L, Nissan Chemicals Co., Ltd.). The formed layer was dried at 80° C. for 20 minutes, and further heated at 180° C. for 60 minutes to form an orientation layer. The orientation layer was subjected to slight rubbing treatment.

On another substrate, a striped electrode of ITO and a polyimide orientation layer were formed in the same manner as described above. The orientation layer was subjected to rubbing treatment. The treated substrate and the three-color filter substrate were laminated so that the orientation layers might face each other and so that their rubbing directions might be reversely parallel. In this lamination, thermosetting epoxy resin containing spherical spacers (diameter: 6 μm) was used.

A mixture consisting of n-type liquid crystal (ZLI-4318, Merck Japan Co., Ltd.) in the amount of 97.5 wt. % and dichromatic dye (NKX-1366, Nippon Photosensitive Dye Co., Ltd.) in the amount of 2.5 wt. % was charged between the substrates, and the edges were sealed.

On the substrate not having the three-color filter, the circularly polarizing plate prepared in Example 1 was laminated with an adhesive. Thus, a liquid crystal display having the structure shown in FIG. 5 was prepared.

When voltage was applied, the liquid crystal display gave a color image with high contrast.

EXAMPLE 4
[Preparation of Liquid Crystal Display]

The procedure of Example 3 was repeated except that the quarter wave plate prepared in Example 2 was used, to prepare a liquid crystal display.

When voltage was applied to the prepared liquid crystal display, a color image with high contrast was displayed.

EXAMPLE 5
[Preparation of Liquid Crystal Display]

After subjected to ultrasonic cleaning, a glass substrate was spin-coated with polyimide orientation layer material (LX-1400, Hitachi Chemicals-Du Pont). The applied layer was dried at 80° C. for 20 minutes, and then further heated at 250° C. for 60 minutes. After the formed orientation layer was subjected to rubbing treatment, the cholesteric liquid crystal B ink used in Example 3 was spin-coated and heated at 120° C. for 10 minutes to align the liquid crystal molecules.

The layer of the liquid crystal B. ink was exposed to ultraviolet light through a photomask, and then subjected to solvent development and rinse treatment to prepare a blue-selective reflection color filter (width: 100 μm, pitch: 300 μm).

The above procedure was repeated except that the cholesteric liquid crystal G ink used in Example 3 was used in place of the cholesteric liquid crystal B ink, to prepare a green-selective reflection color filter.

Further, the procedure was repeated except that the cholesteric liquid crystal R ink used in example 3 was used in place of the cholesteric liquid crystal B ink, to prepare a red-selective reflection color filter.

The patterning was performed so that the pixels of R, G and B in the first layer might be superposed on those of R, G and B in the second layer, respectively. The post-bake treatment was then performed at 250° C. for 10 minutes to prepare a three-color filter substrate.

On the three-color filter substrate, optically anisotropic layers B and A were successively formed in this order in the manner described in Example 1. An ITO layer was formed by sputtering, and then subjected to etching treatment to make a striped pattern. The striped ITO layer was spin-coated with polyimide orientation layer material for vertical alignment (SE-7511L, Nissan Chemicals Co., Ltd.). The formed layer was dried at 80° for 20 minutes, and further heated at 180° C. for 60 minutes to form an orientation layer. The orientation layer was subjected to rubbing treatment.

On another substrate, a striped electrode of ITO and a polyimide orientation layer were formed in the same manner as described above. The orientation layer was subjected to rubbing treatment. The treated substrate and the three-color filter substrate were laminated so that the orientation layers might face each other and so that their rubbing directions might be reversely parallel. In this lamination, thermosetting epoxy resin containing spherical spacers (diameter: 6 μm) was used.

A mixture consisting of p-type liquid crystal (ZLI-1132, Merck Japan Co., Ltd.) in the amount of 99.7 wt. % and an chiral agent (CB-15) in the amount of 0.3 wt. % was charged between the substrates, and the edges were sealed.

A reflection polarizing plate (transmitting clockwise circularly polarized light) having a cholesteric structure was laminated on the three-color filter substrate. On the other hand, another polarizing plate consisting of a linearly polarizing membrane and a protective film was laminated with an adhesive on the substrate not having the three-color filter. Thus, a liquid crystal display having the structure shown in FIG. 6 was prepared.

When voltage was applied, the liquid crystal display gave a color image with high contrast.

EXAMPLE 6
[Preparation of Liquid Crystal Display]

The procedure of Example 5 was repeated except that the quarter wave plate prepared in Example 2 was used, to prepare a liquid crystal display.

When voltage was applied to the prepared liquid crystal display, a color image with high contrast was displayed.

We claim:

1. A liquid crystal display which comprises a liquid crystal cell, a linearly polarizing membrane, a cholesteric liquid crystal layer and a quarter wave plate, said cholesteric liquid crystal layer being divided into two or more areas having different spiral pitches of cholesteric liquid crystal, wherein the quarter wave plate comprises an optically anisotropic layer A and an optically anisotropic layer B, one of said optically anisotropic layers A and B being formed from liquid crystal molecules, the other being formed from liquid crystal molecules or made of a polymer film, and said quarter wave plate giving a retardation value per wavelength within the range of 0.2 to 0.3 at each wavelength of 480 nm, 550 nm and 630 nm.

2. The liquid crystal display as defined in claim 1, wherein at least one of the optically anisotropic layers A and B is formed from discotic liquid crystal molecules.

3. The liquid crystal display as defined in claim 1, wherein at least one of the optically anisotropic layers A and B is formed from rod-like liquid crystal molecules.

4. The liquid crystal display as defined in claim 1, wherein one of the optically anisotropic layers A and B is formed from discotic liquid crystal molecules, and the other is formed from rod-like liquid crystal molecules.

5. The liquid crystal display as defined in claim 1, wherein the quarter wave plate has a thickness of 500 nm to 20 μm.

6. The liquid crystal display as defined in claim 1, wherein the liquid crystal display comprises a light-absorbing layer, the cholesteric liquid crystal layer, the liquid crystal cell, the quarter wave plate and the linearly polarizing membrane in order.

7. The liquid crystal display as defined in claim 1, wherein the liquid crystal display comprises a backlight source, the linearly polarizing membrane, the quarter wave plate, a light-absorbing color filter, the cholesteric liquid crystal layer and the liquid crystal cell in order.

8. The liquid crystal display as defined in claim 1, wherein the liquid crystal display comprises a backlight source, a reflective polarizing plate, the cholesteric liquid crystal layer, the quarter wave plate, the liquid crystal cell and the linearly polarizing membrane in order.

* * * * *